8491X
No Printed Specification Available
R. French,
Making Augers,
Patented Nov. 11, 1834.
Plate. 1
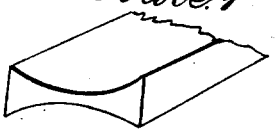
Plate. 2.
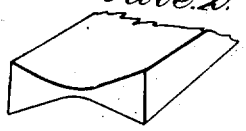
Plates 3.
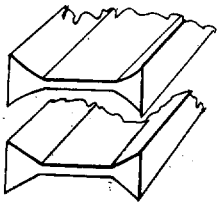
N. PETERS, PHOTO-LITHOGRAPHER, WASHINGTON, D. C.

Raymond French.
Letters Patent dated November 11. 1834

The schedule referred to in these Letters Patent and making part of the same, containing a description in the words of the said Raymond French, himself of his improvement in Screw, Spur and pump Augurs, Screw & Spur bitts.

---

To all to whom these presents shall come.

Be it known that I Raymond French, of Derby in the County of New Haven and State of Connecticut, have invented a new and useful improvement in the form and construction of screw, spur & pump Augurs, Screw & Spur bitts; & that the following is a full and exact description of the construction and operation of the said instruments, as invented or improved by me.

[The plates from which the pods are formed, are constructed of a longitudinal concave surface, or in any other manner, so that the plate as well as the pod when twisted shall be thinner in the centre and middle than upon its edges. This may be effected by a regular concavity, from one edge to the other, upon each of its sides. (see plate No1) or by an obtuse angle from the longitudinal centre to the edges (see plate No 2) or by an even plate in the middle varying in width according to the dimensions of the plate, and elevated or thickened upon the edges (see plate No3).] In general about one inch of the lower extremity of the plate is of the usual construction, that is to say of even thickness, for the purpose of raising and strengthening the lips of the screw.

The middle of the plate is to be made as thin as possible and retain its position in the process of manufacturing the same as well as sustaining itself when applied to edge; being generally about one sixteenth part of an inch thick in a plate of one inch in breadth, and varying with the size of the plate as well as the quality of metal. The edges of a plate of one inch breadth, are to be made generally about three eighths of an inch thick varying still with the breadth of the plate (See illustrations). Said instruments are twisted and finished, in other respects in the usual manner.

The object attained by this method of constructing the plate is, that it gives the spiral cylinders of the pod when twisted, a greater capacity toward the inner surface of the same and more perfectly envelops the core or chips within a metallic surface, in their passage from the bottom to the top of the hole while boring, by which the chips or [illegible] are permitted to rise and flow off more freely and rapidly being prevented in a great degree from friction upon the surface of the hole, and from clogging within the pod. A coarser screw may be given to the tool constructed in this manner, than in the usual form, and the strength and durability of the instrument are increased by extending the principle part of the metal, more remotely from the axes or longitudinal centre of the instrument.

In short all I claim, as my invention, in the foregoing improvement, is the principle and its application to augers of constructing the plate and pod of screw augers and bitts thicker upon the edges than in the middle, under the modifications and in the manner here specified, and that the same principle and form may be applied to all tools used for boring holes in wood or timber having a twisted pod and an spiral screw cylinder.

Witnesses
John Clark Wheeler
[illegible] Ames

Raymond French

Received and Recorded [illegible] Feb 13, 1845.